United States Patent
Narasimhan

(10) Patent No.: US 9,854,272 B2
(45) Date of Patent: *Dec. 26, 2017

(54) METHOD AND APPARATUS FOR DECODING AN ENHANCED VIDEO STREAM

(71) Applicant: ARRIS Technology, Inc., Suwanee, GA (US)

(72) Inventor: Mandayam A. Narasimhan, San Diego, CA (US)

(73) Assignee: ARRIS Enterprises, Inc., Suwanee, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/862,200

(22) Filed: Sep. 23, 2015

(65) Prior Publication Data
US 2016/0014431 A1    Jan. 14, 2016

Related U.S. Application Data

(63) Continuation of application No. 13/733,870, filed on Jan. 3, 2013, now Pat. No. 9,167,246, which is a
(Continued)

(51) Int. Cl.
*H04N 7/12* (2006.01)
*H04N 19/70* (2014.01)
(Continued)

(52) U.S. Cl.
CPC ............ *H04N 19/70* (2014.11); *H04N 7/52* (2013.01); *H04N 19/127* (2014.11);
(Continued)

(58) Field of Classification Search
CPC .......................... H04N 7/26941; H04N 7/50
(Continued)

(56) References Cited

U.S. PATENT DOCUMENTS

| 8,369,415 B2 * | 2/2013 | Narasimhan | H04N 7/52 |
| | | | 375/240.26 |
| 2005/0180512 A1 * | 8/2005 | Narasimhan | H04N 21/2368 |
| | | | 375/240.28 |

(Continued)

FOREIGN PATENT DOCUMENTS

| CN | 1917647 A | 2/2007 |
| JP | 2001-500674 A | 1/2001 |

(Continued)

OTHER PUBLICATIONS

"Advanced Video Coding for Generic Audiovisual Services: Series H: Audiovisual and Multimedia Systems, Infrastructure of Audiovisual Services-Coding of Moving Video", Telecommunication Standardization Sector of ITU, ITU-T Recommendation H.264, Nov. 2007.

(Continued)

*Primary Examiner* — Christopher R Crompton
(74) *Attorney, Agent, or Firm* — Stewart M. Wiener

(57) ABSTRACT

A method of decoding an enhanced video stream composed of base layer video access units and enhancement layer video access units, each access unit comprising a plurality of syntax structures, includes passing the syntax structures of the base layer access units to a base layer buffer, passing syntax structures of the enhancement layer access units to an enhancement layer buffer, outputting the syntax structures passed to the base layer buffer in a predetermined sequence, outputting the syntax structures passed to the enhancement layer buffer in a predetermined sequence, and recombining the sequences of syntax structures output by the base layer buffer and the enhancement layer buffer respectively to form a complete enhanced access unit, composed of base layer syntax structures and enhancement layer syntax structures in a predetermined sequence.

14 Claims, 3 Drawing Sheets

Related U.S. Application Data continuation of application No. 12/395,056, filed on Feb. 27, 2009, now Pat. No. 8,369,415.

(60) Provisional application No. 61/034,370, filed on Mar. 6, 2008.

(51) Int. Cl.

| | | |
|---|---|---|
| H04N 7/52 | (2011.01) | |
| H04N 21/2343 | (2011.01) | |
| H04N 21/44 | (2011.01) | |
| H04N 21/845 | (2011.01) | |
| H04N 21/434 | (2011.01) | |
| H04N 19/30 | (2014.01) | |
| H04N 19/127 | (2014.01) | |
| H04N 19/146 | (2014.01) | |
| H04N 19/187 | (2014.01) | |
| H04N 19/44 | (2014.01) | |
| H04N 19/423 | (2014.01) | |
| H04N 19/152 | (2014.01) | |
| H04N 19/61 | (2014.01) | |

(52) U.S. Cl.
CPC ......... *H04N 19/146* (2014.11); *H04N 19/152* (2014.11); *H04N 19/187* (2014.11); *H04N 19/30* (2014.11); *H04N 19/423* (2014.11); *H04N 19/44* (2014.11); *H04N 19/61* (2014.11); *H04N 21/234327* (2013.01); *H04N 21/4343* (2013.01); *H04N 21/44004* (2013.01); *H04N 21/8451* (2013.01); *H04N 7/50* (2013.01)

(58) Field of Classification Search
USPC .................................................. 375/240.26
See application file for complete search history.

(56) References Cited

U.S. PATENT DOCUMENTS

| | | |
|---|---|---|
| 2006/0227871 A1 | 10/2006 | Budagavi |
| 2007/0183494 A1 | 8/2007 | Hannuksela |
| 2007/0201811 A1 | 8/2007 | Bruls |
| 2007/0230564 A1* | 10/2007 | Chen .............. H04N 21/234327 375/240.01 |
| 2008/0095228 A1 | 4/2008 | Hannuksela et al. |
| 2008/0165844 A1 | 7/2008 | Karczewicz |
| 2011/0019747 A1 | 1/2011 | Hannuksela et al. |
| 2011/0064142 A1 | 3/2011 | Haskell et al. |

FOREIGN PATENT DOCUMENTS

| | | |
|---|---|---|
| JP | 2007-266748 A | 10/2007 |
| JP | 2009-010649 A | 1/2009 |
| JP | 2009-531999 A | 9/2009 |
| WO | 97/28507 A1 | 8/1997 |
| WO | 2005/050346 A2 | 6/2005 |
| WO | 2007/115129 A1 | 10/2007 |
| WO | 2007110742 A2 | 10/2007 |
| WO | 2007115129 A1 | 10/2007 |

OTHER PUBLICATIONS

"Information Technology-Coding of Audio-Visual Objects—Part 15: Advanced Video Coding (AVC) file format", International Standard, ISO/IEC 14496-15, Apr. 2004.
Amon, P. et al., "File Format for Scalable Video Coding", IEEE Transactions on Circuits and Systems for Video Technology, vol. 17, No. 9, Sep. 2007.
Bai, G. et al., "File Format for Storage of Scalable Video", Journal of Zhejiang University, Feb. 2006.
Berthelot B, et al, "Carriage of MPEG-4 SVC Over MPEG-2 Systems", ITU Study Group 16—Video Coding Experts Group—ISO/IEC MPEG and ITU-T VCEG (ISO/IEC JTC1/SC29/WG11 and ITU-T SG16 Q6), Jan. 10, 2007.
Rathgen, T. et al., "Proposal for SVC File Format Specification", Seimens AG, International Organziation for Standardization, ISO/IEC JTC1/WG11, Coding of Moving Pictures and Audio, Jul. 2005.
Schwarz, H. et al., "Overview of the Scalable Video Coding Extension of the H.264/AVC Standard", IEEE Transactions on Circuits and Systems for Video Technology, vol. 17, No. 9., Sep. 2007.
Visharam, M. et al., "Scalable Video Coding (SVC) File Format", Sony Electronics, Inc., International Organization for Standardization, ISO/IEC JTC1/SC29/WG11, Coding of Moving Pictures and Audio, Jul. 2005.
European Examination Report, RE: Application No. 14189574.8, dated Oct. 14, 2016.
T. Wiegand et al., editors, "Text of ISO/IEC 13818-1:2007/FPDAM 3.2—Transport of Scalable Video over ITU-T Rec H.222.0 | ISO/IEC 13818-1", 83. MPEG Meeting; Jan. 14, 2008-Jan. 18, 2008; Antalya; (Motion Picture Expert Group or ISO/IEC JTC1/SC29/WG11), No. N9669, Feb. 7, 2008 (Feb. 7, 2008), XP030016163, ISSN: 0000-0043.
Official Action, RE: Chinese Divisional Application No. 201410326963.0, dated Jan. 5, 2017.
Official Action, Re: Chinese Divisional Application No. 201510279266.9, dated Jul. 18, 2017.
Examination Report, Re: European Application No. 14189574.8, dated Jul. 21, 2017.
Official Action, RE: Chinese Divisional Application No. 201410326963.0, dated Sep. 5, 2017.

\* cited by examiner

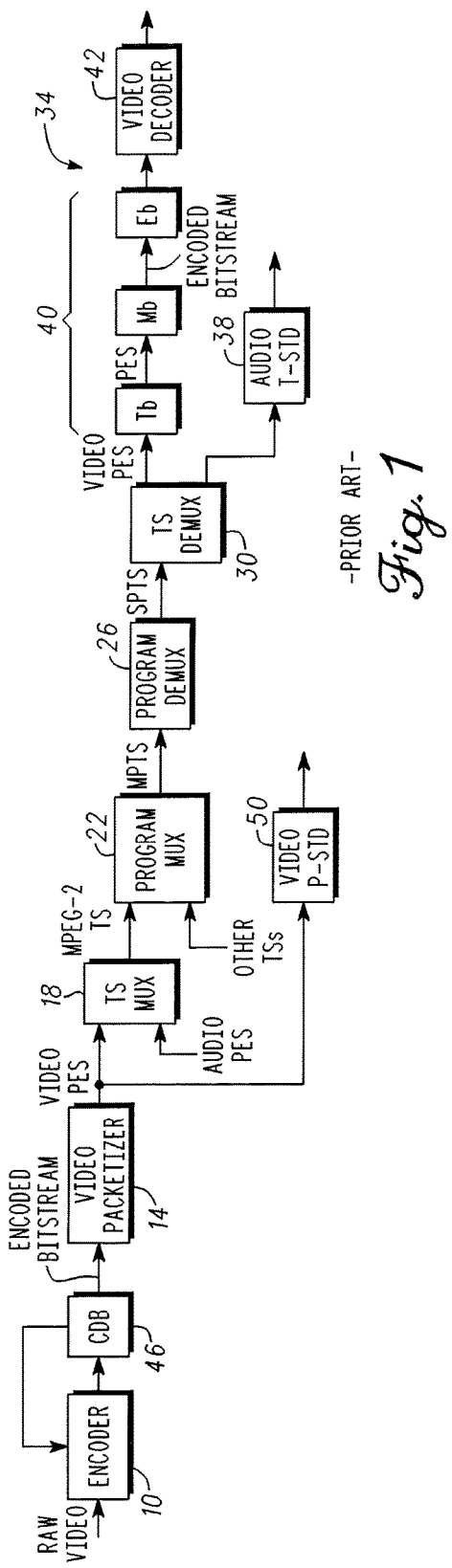
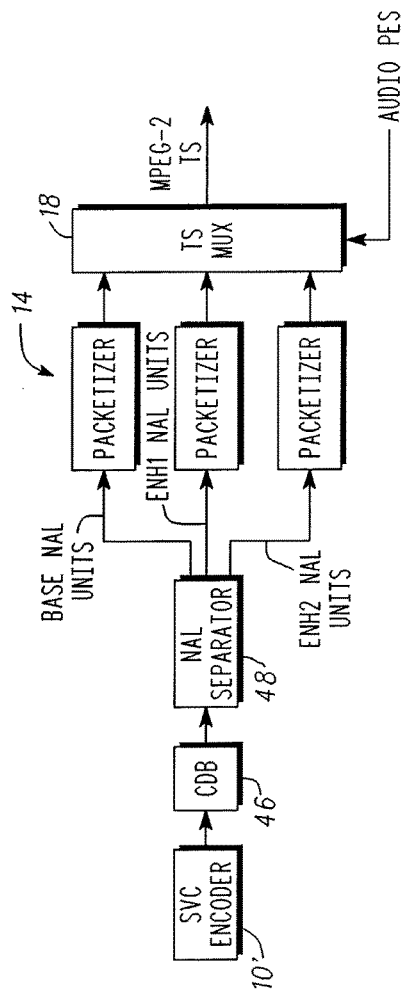

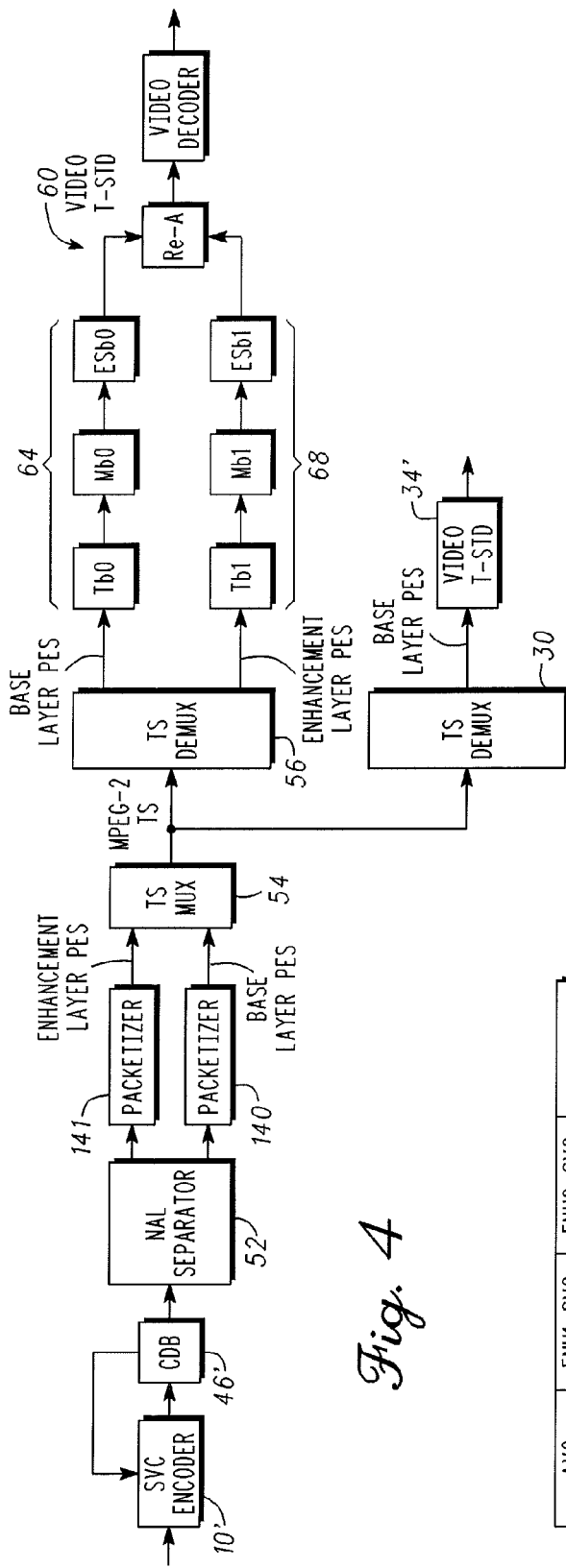

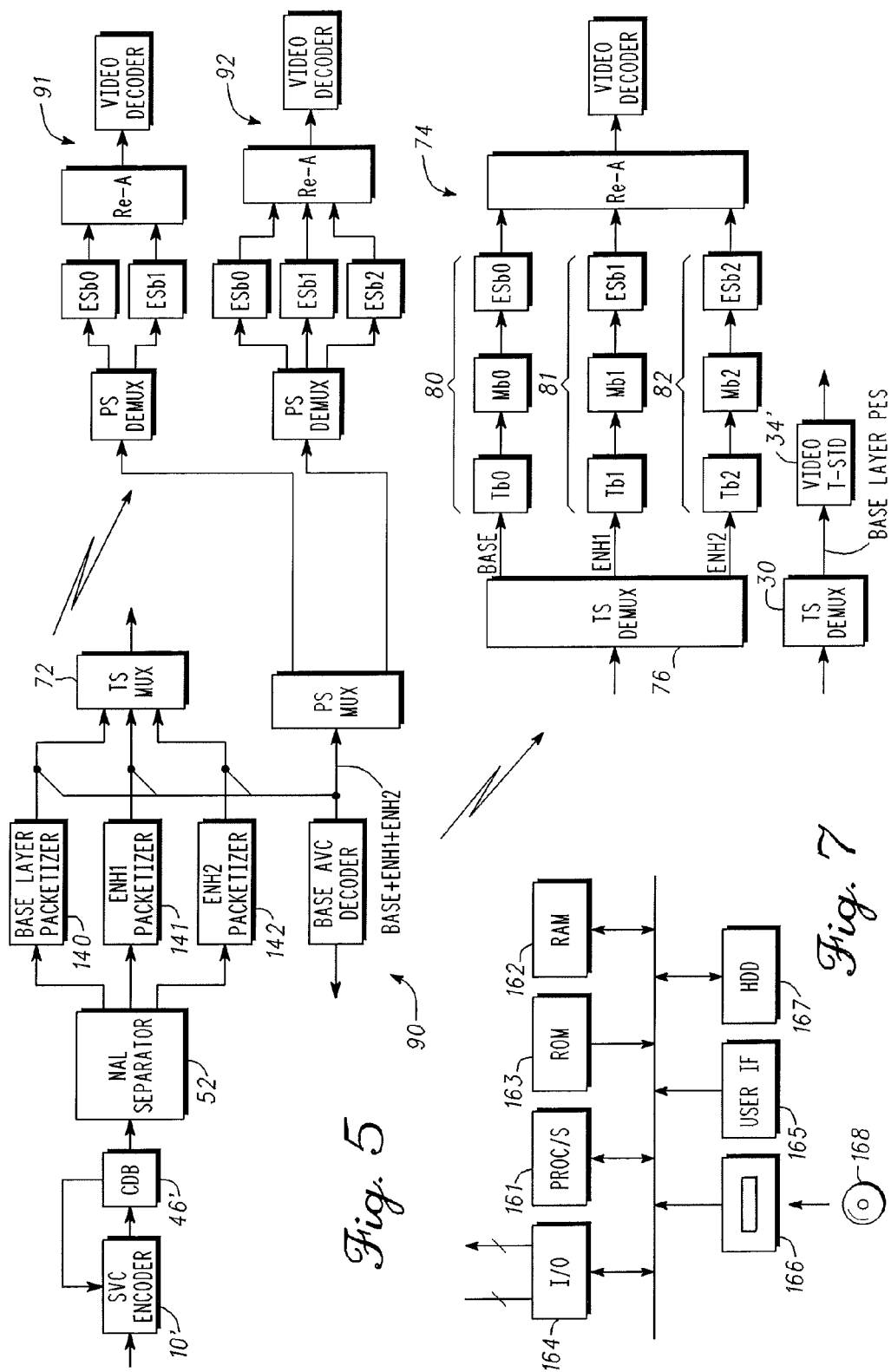

METHOD AND APPARATUS FOR DECODING AN ENHANCED VIDEO STREAM

CROSS-REFERENCE TO RELATED APPLICATION

This application is a continuation of U.S. patent application Ser. No. 13/733,870, filed Jan. 3, 2013, which is a continuation of U.S. patent application Ser. No. 12/395,056, filed Feb. 27, 2009(issued as U.S. Pat. No. 8,369,415 on Feb. 5, 2013), claims the benefit under 35 USC 120 of U.S. Provisional Application No. 61/034,370 filed Mar. 6, 2008, the entire disclosure of which is hereby incorporated by reference herein for all purposes.

BACKGROUND OF THE INVENTION

This invention relates to a method and apparatus for decoding an enhanced video stream.

Referring to FIG. 1 of the drawings, a video encoder 10 receives raw video data, typically in the HD-SDI format defined in SMPTE 292M, from a source such as a camera. The video encoder utilizes the HD-SDI data to generate a video elementary stream and supplies the video elementary stream to a video packetizer 14, which produces a video packetized elementary stream (PES) composed of variable length packets. Typically, each packet of the video PES contains one or more video frames. Similarly, an audio encoder (not shown) receives raw audio data from, for example, a microphone and supplies an audio elementary stream to an audio packetizer, which creates an audio PES composed of variable length packets.

The video and audio packetizers supply the video and audio PESs to a transport stream multiplexer 18, which assigns different respective program identifiers (PIDs) to the video PES and the audio PES and organizes the variable-length packets of the video and audio PESs as fixed-length MPEG-2 transport stream (TS) packets each having a header that includes the PID of the PES and a pay load containing the PES video (or audio) data.

The single program transport stream (SPTS) that is output by the transport stream multiplexer may be supplied to a program multiplexer 22 that combines the SPTS with other transport streams, conveying other programs, to produce a multi-program transport stream (MPTS). The MPTS is transmitted over a channel to a receiver at which a program demultiplexer 26 separates a selected SPTS from the MPTS and supplies it to a transport stream demultiplexer 30. It will be appreciated by those skilled in the art that the SPTS that is output by the transport stream multiplexer may be transmitted directly to the transport stream demultiplexer without first being combined with other transport streams to create the MPTS but in either case the transport stream demultiplexer receives the transport stream packets of the selected SPTS and separates them on the basis of PID, depacketizes the transport stream packets to recreate the PES packets, and directs the video PES to a so-called video system target decoder (T-STD) 34 and the audio PES to an audio T-STD 38. The subject matter of this application is concerned with decoding a video bitstream and accordingly we will not discuss the audio decoder further.

The video T-STD 34 comprises a system target decoder buffer 40 and a video decoder 42, The STD buffer 40 is functionally equivalent to a transport buffer Tb, a multiplexing buffer Mb, and an elementary stream buffer Eb. The transport buffer Tb receives the video PES at a variable bit rate and outputs the data at a constant bit rate to the multiplexing buffer Mb, which depacketizes the video PES and supplies an encoded bit stream at a constant bit rate to the elementary stream buffer Eb. The elementary stream buffer, which is sometimes referred to as the decoder buffer or as the coded picture buffer (CPB), receives the CBR bitstream and holds the bits for decoding a picture until they are all removed instantaneously by the video decoder at the picture decode time.

It is important to proper operation of the decoder that the decoder buffer should neither overflow, so that bits are lost and a picture cannot be decoded, or underflow, so that the decoder is starved of bits and is unable to decode a picture at the proper time. The supply of bits to the decoder buffer is controlled by a compressed data buffer (CDB) 46 that receives the bitstream from the video encoder 10. The video encoder supplies bits to the CDB at a rate that depends on the fullness of the CDB. The CDB supplies bits to the video packetizer 14 at a constant rate and the multiplexing buffer supplies bits to the decoder buffer at the same rate, and accordingly the fullness of the CDB mirrors the fullness of the decoder buffer. By adjusting supply of bits to the CDB so as to prevent overflow/underflow of the CDB, we avoid underflow/overflow of the decoder buffer.

The video compression standard governing operation of the encoder may specify that the CDB should be no larger than the decoder buffer of a hypothetical reference decoder.

The MPEG-2 transport stream is widely used for delivery of encoded video over an error prone channel. The MPEG-2 system layer also provides for transmission of encoded video in the program stream (PS) in an error free environment, FIG. 1 illustrates transmission of the video PES as a program stream to a video P-STD 50 as an alternative to delivery as a transport stream to the video T-STD 34.

The bitstream produced by the video encoder 10 may comply with the video compression standard that is specified in ISO/SEC 14496-10 (MPEG-4 part 10) Advanced Video Coding (AVC), commonly referred to as H.264/AVC. H.264/AVC uses picture as a collective term, for a frame or field. H.264/AVC defines an access unit as a set of network abstraction layer (NAL) units and specifies that the decoding of an access unit always results in a decoded picture. A NAL unit of an access unit produced by an AVC encoder may be a video coding layer (VCL) unit, which contains picture information, or a non-VCL unit, which contains other information, such as closed captioning and timing.

Annex G of H.264/AVC prescribes art extension of H.264/AVC known as scalable video coding or SVC. SVC provides scalable enhancements to the AVC base layer, and the scalability includes spatial scalability, temporal scalability, SNR scalability and bit depth scalability. An SVC encoder is expected, to create an H.264/AVC conformant base layer and to add enhancement to that base layer in one or more enhancement layers. Each type of scalability that is employed in a particular implementation of SVC may utilize its own enhancement layer. For example, if the raw video data is in the format known as 1080 HD, composed of frames of 1920×1088 pixels, the base layer may be conveyed by a sub-bitstream composed of access units that can be decoded as pictures that are 704×480 pixels whereas an enhancement layer may be conveyed by a sub-bitstream that is composed of access units that enable a suitable decoder to present pictures that are 1920×1088 pixels by combining the base layer access units with the enhancement layer access units.

A decoder having the capability to decode both a base layer and one or more enhancement layers is referred to herein as an SVC decoder whereas a decoder that cannot recognize an enhancement layer and is able to decode only the base layer access units, and therefore does not have SVC capability, is referred to herein as an AVC decoder.

An access unit produced by an SVC encoder comprises not only the base layer NAL units mentioned above, which may be conveniently referred to as AVC NAL units, but also SVC VCL NAL units and SVC non-VCL NAL units. FIG. 2 shows the sequence of AVC NAL units and SVC NAL units in an SVC access unit as prescribed by the SVC standard. In the event that the encoder produces, for example, two enhancement layers, the non-VCL NAL units for the two enhancement layers are in adjacent blocks of the sequence shown in FIG. 2, between the blocks containing the AVC non-VCL NAL units .and the AVC VCL NAL units, and the SVC VCL NAL units for the two enhancement layers are in adjacent blocks of the sequence after the block containing the AVC VCL NAL units.

An SVC decoder that extracts the base layer NAL units from the access unit selects only the AVC non-VCL NAL units and the AVC VCL NAL units.

H.264/AVC specifies a five-bit parameter nal_unit_type, or NUT. Under H.264/AVC, AVC NAL units alt have NUT values in the range 1-13. SVC adds NUT values 14, 20 and 15. However, a NAL unit having NUT equal 14 immediately preceding NAL units having NUT equal 5 or 1 signals base layer slices, such that these NAL units, which are non-VCL NAL units, are compatible with AVC and can be decoded by an AVC decoder.

Referring to FIG. 3, an SVC encoder 10' generates a unitary bitstream that conveys the base layer and, for example, two enhancement layers ENH1 and ENH2. Depending on its capabilities, a decoder might expect to receive, and decode, the base layer only, or the base layer and enhancement layer ENH1, or the base layer and both enhancement layer ENH1 and enhancement layer ENH2. Under the MPEG-2 systems standard and use case for SVC, the encoder may not provide three bitstreams, conveying respectively the base layer only, the base layer and enhancement layer ENH1, and the base layer and both enhancement layer ENH1 and enhancement layer ENH2 and allow the decoder to select whichever bitstream it is able to decode. The encoder must provide the base layer access units and parts of each enhancement layer in separate bitstreams. It would be possible in principle to comply with the MPEG-2 systems standard by using a NAL separator 48 to separate the unitary bitstream into three sub-bitstreams based on the NUT values of the NAL units. One sub-bitstream would convey the base layer NAL units and the other two sub-bitstreams would convey the NAL units for the two enhancement layers respectively. The three sub-bitstreams would pass to respective video packetizers (generally designated 14), which create respective video PESs. The three video PESs would be supplied to a transport stream multiplexer 18 including a T-STD boiler equivalent to the buffer that is included in an SVC T-STD, for the purpose of multiplexing together the outputs of the three packetizers. The multiplexer 18 would assign different PIDs to the three PESs and outputs a transport stream conveying the three layers.

The video T-STD 34 shown in FIG. 1 is unable to decode the bitstream conveyed by the transport stream produced by the transport stream multiplexer 18' shown in FIG. 3 because it provides no capability to reassemble the base layer and enhancement layer access units to produce a complete SVC access unit that can be decoded by an SVC decoder. Neither the H.264/AVC standard nor the MPEG-2 systems standard prescribes how the base layer and enhancement layer access units should be reassembled. Therefore, the architecture shown in FIG. 3 has hitherto lacked practical application.

SUMMARY OF THE INVENTION

In accordance with a first aspect of the disclosed subject matter there is provided a method of decoding an enhanced video stream composed of base layer video access units and enhancement layer video access units, each access unit comprising a plurality of syntax structures, said method comprising passing the syntax structures of the base layer access units to a base layer buffer, passing syntax structures of the enhancement layer access units to an enhancement layer baiter, outputting the syntax structures passed to the base layer buffer in a predetermined sequence, outputting the syntax structures passed to the enhancement layer buffer in a predetermined sequence, and recombining the sequences of syntax structures output by the base layer buffer and the enhancement layer boiler respectively to form a complete enhanced access unit, comprising base layer syntax structures and enhancement layer syntax structures in a predetermined sequence.

In accordance with a second aspect of the disclosed subject matter there is provided a method of creating an enhanced video signal comprising receiving a unitary bitstream composed of base layer access units and enhancement layer access units, separating a base layer program stream and an enhancement layer program stream from the unitary bitstream, and inserting a delimiting syntax structure into the enhancement layer program stream.

In accordance with a third aspect of the disclosed subject matter there is provided a method of creating an enhanced video signal comprising receiving a unitary bitstream composed of base layer access units and enhancement layer access units, wherein, each enhancement layer access unit comprises video layer syntax structures and non-video layer syntax structures, separating a base layer program stream and an enhancement layer program stream from the unitary bitstream, and including non-video layer syntax structures of the enhancement layer access units in the base layer program stream, whereby the enhanced video signal comprises a base layer component that includes non-video layer syntax structures of the enhancement layer access units and an enhancement layer component that includes video layer syntax structures of the enhancement layer access units.

In accordance with a fourth aspect, of the disclosed subject matter there is provided a decoding apparatus for decoding a base layer program stream conveying a succession of base layer access units of an enhanced video stream and at least one enhancement layer program stream conveying a succession of enhancement layer access units of said enhanced video stream, each access unit comprising a plurality of syntax structures, the decoding apparatus comprising a base layer buffer connected to receive the base layer program stream and to output syntax structures of each base layer access unit in a predetermined sequence, an enhancement layer buffer connected to receive the enhancement layer program stream and to output syntax structures of each enhancement layer access unit hi a predetermined sequence, a reassembly functional element connected to receive the syntax structures output by the base layer buffer and the enhancement layer buffer respectively and to form a complete enhanced access unit, comprising base layer syntax structures and enhancement layer syntax structures in a predetermined sequence.

In accordance with a fifth aspect of the disclosed subject matter there is provided apparatus for creating an enhanced video signal, the apparatus having an input for receiving a unitary bitstream composed of base layer access units and enhancement layer access units and comprising a separator for separating a base layer program stream and an enhancement layer program stream from the unitary bitstream, and an inserter for inserting a delimiting syntax structure into the enhancement layer program stream.

In accordance with, a sixth, aspect, of the disclosed subject matter there is provided apparatus for creating an enhanced video signal, the apparatus having an input for receiving a unitary bitstream composed of base layer access units and enhancement layer access units, wherein each enhancement layer access unit comprises video layer syntax structures and non-video layer syntax structures, and comprising a separator for separating a base layer program stream and an enhancement layer program stream from the unitary bitstream and including non-video layer syntax structures of the enhancement layer access units in the base layer program stream, whereby the enhanced video signal comprises a base layer component that includes non-video layer syntax structures of the enhancement layer access units and an enhancement layer component that includes video layer syntax structures of the enhancement layer access units.

In accordance with a seventh aspect of the disclosed subject matter there is provided a computer readable medium containing software that, when executed by a computer having an input for receiving an enhanced video stream that conveys base layer access units mid enhancement layer access units, each access unit comprising a plurality of syntax structures, processes the video stream by a method comprising passing the syntax structures of the base layer access units to a base layer buffer, passing syntax structures of the enhancement layer access units to an enhancement layer buffer, outputting the syntax structures passed to the base layer buffer in a predetermined sequence, outputting the syntax structures passed to the enhancement layer buffer in a predetermined sequence, and recombining the sequences of syntax, structures output by the base layer buffer and the enhancement layer buffer respectively to form a complete enhanced access unit, comprising base layer syntax structures and enhancement layer syntax structures in a predetermined sequence.

In accordance with a eighth aspect of the disclosed subject matter there is provided a computer readable medium containing software that, when executed by a computer having an input for receiving a unitary bitstream composed of base layer access units and enhancement layer access units, processes the bitstream by a method comprising separating a base layer program stream and an enhancement layer program stream from the unitary bitstream, and inserting a delimiting syntax structure into the enhancement layer program stream.

In accordance with a ninth aspect of the disclosed subject matter there is provided a computer readable medium containing software that, when executed by a computer having an input for receiving a unitary bitstream composed of base layer access units and enhancement layer access units, wherein each enhancement layer access unit comprises video layer syntax structures and non-video layer syntax structures, processes the bitstream by a method comprising separating a base layer program stream and an enhancement layer program stream from the unitary bitstream, and including non-video layer syntax structures of the enhancement layer access units in the base layer program stream, whereby the enhanced video signal comprises a base layer component that includes non-video layer syntax structures of the enhancement layer access units and an enhancement layer component that includes video layer syntax structures of the enhancement layer access units.

BRIEF DESCRIPTION OF THE DRAWINGS

For a better understanding of the invention, and to show how the same may be carried into effect, reference will now be made, by way of example, to the accompanying drawings, in which:

FIG. 1 is a block schematic illustration of the architecture of a first system for supplying compressed video material for presentation, FIG. 2 illustrates the structure of an SVC access unit with base layer and one enhancement layer, FIG. 3 is a block schematic illustration of the architecture and use case for transmission of compressed SVC video material for decode and presentation, FIG. 4 is a block schematic illustration of the architecture of a second system for supplying compressed video material for presentation, FIG. 5 is a block schematic illustration of the architecture of a third system for supplying compressed video material for presentation, FIG. 6A, 68 and 6C Illustrate the structure of data units generated at various points in the system shown in FIG. 5, and FIG. 7 is a Is a block schematic diagram of a computing machine that may be used to implement parts of the processes described with reference to FIGS. 4 and 5.

In the several Figures of the drawings. Like reference signs are used to designate Like or equivalent elements, functions or components.

DETAILED DESCRIPTION

The SVC encoder 10' shown in FIG. 4 generates a bitstream that conveys the base Layer and one enhancement layer. The NAL separator 52 divides the bitstream into two sub-bitstreams conveying, respectively, the base layer NAL units and the enhancement layer NAL units and the two sub-bitstreams pass to a base layer video packetizer $14_0$ and an enhancement Layer video packetizer $14_1$. As described with reference to FIG. 3, the two packetizers create respective video PESs. The transport stream multiplexer 54 assigns different PIDs to the two PESs and outputs a transport stream conveying the two layers. The transport stream multiplexer 54 includes a T-STD buffer conforming to the SVC T-STD model. The transport stream is transmitted either as an SPTS directly to a transport stream demultiplexer 56 or is multiplexed with other transport streams and is supplied as part of an MPTS to the transport stream demultiplexer 56 via a program demultiplexer (not shown).

As is conventional, the transport stream demultiplexer 56 separates the transport stream packets on the basis of PID and depacketizes the transport stream packets to re-create the PES packets. In this manner, the transport stream demultiplexer outputs both a base layer PES and an enhancement layer PES, as well as one or more audio PESs. As shown in FIG. 4, the base layer PES and the enhancement layer PES are supplied to a video T-STD 60, which comprises a base layer T-STD buffer 64 and an enhancement layer T-STD buffer 68. The base layer T-STD buffer 64, similarly to the T-STD buffer 40 shown in FIG. 1, includes a transport buffer Tb0 and a multiplexing buffer Mb0. The multiplexing buffer outputs an encoded bitstream containing the base layer access units (the AVC non-VCL NAL units and the AVC VCL NAL units) to an elementary stream buffer segment ESb0. The size of the buffer segment ESb0 may not exceed the size of the elementary stream buffer Eb prescribed in the H.264/AVC standard.

The enhancement layer T-STD buffer 68 also includes a transport buffer Tb1, a multiplexing buffer Mb1 and an elementary stream buffer segment ESb1. Similarly to the multiplexing buffer Mb0, the buffer Mb1 outputs an encoded bitstream containing die enhancement layer access units (the SVC non-VCL NAL units and the SVC VCL NAL units) which when combined appropriately with base layer access units produces an SVC access unit as defined in Annex G of H.264.

The combined size of the buffer segments ESb0 and ESb1 may not exceed the size of the elementary stream buffer Eb prescribed in Annex G of the H.264/AVC standard for an SVC decoder that decodes a program having a base layer and one enhancement layer. However, the total permitted buffer size may be allocated between the buffer segments to optimize performance of the decoder, provided that the size of the buffer segment ESb0 does not exceed the size of the elementary stream buffer Eb prescribed in the H.264/AVC standard for an AVC decoder.

It will be understood by those skilled in the art that the NAL units of an access unit received by the transport stream demultiplexer 56 might not be in the order required .for decoding the access unit. The elementary stream buffer segments, which receive the encoded bitstreams provided by the multiplexing buffers, ensure that the NAL units of each access unit are output in the proper order for decoding. A reassembly function Re-A receives the AVC and SVC NAL units output by the two T-STD buffers respectively and combines the NAL units in. the proper sequence to re-create the SVC access unit structure shown in FIG. 2. The reassembly function supplies the SVC access units to the SVC decoder for decoding at the proper respective decode times,. In this manner, the T-STD 60 is able to output pictures that include the enhancements supported by SVC.

The buffer management (i.e., the sizes of the transport buffer, multiplexing buffer and the combined elementary stream buffer segments as well as the transfer rate between the buffers) is the same as in a conventional MPEG-2 T-STD. Data enters the elementary stream buffer segments at the rate specified for the output of data from the multiplexing buffer in the conventional MPEG-2 T-STD model, and after both the base layer NAL units and the enhancement layer NAL units of a given SVC access unit are present in the respective elementary stream buffer segments, they are transferred instantaneously to the reassembly (unction where they are combined and transferred instantaneously to the SVC decoder. Thus, the elementary stream buffer segments and the reassembly function do not introduce any latency between the multiplexing buffer and the SVC decoder.

The transport stream output by the transport stream multiplexer 54 may also be supplied to an AVC T-STD 34' via a transport stream demultiplexer 30. The transport stream multiplexer 30 separates the base layer PES from the transport stream and supplies the base layer PES to the T-STD 34'. Since the enhancement layer PES is not supplied to the T-STD 34', the T-STD 34' is not burdened by having to process NAL units that are not needed to decode the base layer access units.

Referring now to FIG. 5, in another embodiment the bitstream produced by the SVC encoder 10' conveys a base layer and two enhancement layers ENH1 and ENH2. The NAL separator 52 separates the bitstream into three sub-bitstreams based on the NUT values of the NAL units, but unlike in the case of FIG. 4 the base layer bitstream. includes not only the AVC NAL units but also the SVC non-VCL NAL units (including the NAL units that are compatible with AVC, as described above). The base layer bitstream produced by the NAL separator has the structure shown, in FIG. 6A. The two enhancement layer sub-bitstreams each contain the SVC VCL NAL units for the respective SVC access units. The NAL separator also inserts an SVC delim NAL unit at the beginning of each access unit of each enhancement layer sub-bitstream, as shown in FIG. 6B. The SVC delim NAL unit may be very small and has a reserved NUT value, such, as 23 or 24. This SVC delim NAL unit is in addition, to the access unit delimiter having NUT equal 9, as mandated by the MPEG-2 systems standard.

The three sub-bitstreams are supplied to the packetizers $14_0$, $14_1$ and $14_2$ respectively, which create respective PESs and supply the PESs to a transport stream multiplexer 72. The transport stream multiplexer 72, which includes a buffer conforming to the SVC T-STD model, assigns different PIDs to the three PESs and outputs a transport stream, conveying the three layers. It will, be appreciated that the base layer PES contains all of the AVC NAL units that are required to decode the base layer access units.

The transport stream created by the transport stream multiplexer 72 is supplied to a transport stream decoding function 74. The transport stream decoding function includes a transport stream demultiplexer 76 which separates the base layer PES and the two enhancement layer PESs based on PID and supplies them to respective T-STD buffers 80, 81 and 82. Each T-STD buffer includes a transport buffer Tb, a multiplexing buffer Mb and an elementary stream buffer segment ESb. The combined, size of the buffer segments ESb0, ESb1 and ESb2 may not exceed, the size of the elementary stream buffer Eb prescribed in Annex G of the H.264/AVC standard for an SVC decoder that decodes a program having a base layer and two enhancement layers. However, the total permitted buffer size may be allocated among the buffer segments to optimize performance of the decoder, provided that the combined size of the buffer segments ESb0 and ESb1 does not exceed the size of the elementary stream, buffer Eb prescribed in Annex G of the H.264/A VC standard for an SVC decoder that, decodes a program having a base layer and one enhancement layer and the size of the buffer segment ESb0 does not exceed the size of the elementary stream buffer Eb prescribed in the H.264/AVC standard for an AVC decoder.

Each T-STD buffer processes the bitstream that it receives in a similar manner to that described with reference to FIG. 4, such that the buffer DRB0 outputs access units having the structure shown in FIG. 6A and the buffers DRB1 and DRB2 each output access units having the structure shown in FIG. 6B. The outputs of the buffer structures are concatenated by a reassembly function Re-A to create the sequence of NAL units for each access unit as shown in FIG. 6C. The output of the reassembly function passes to the elementary stream buffer, as described with reference to FIG. 4.

FIG. 5 shows that the transport stream output by the multiplexer 54 may be supplied to an AVC T-STD 34' via a transport stream demultiplexer 30, as described with reference to FIG. 4.

FIG. 5 also illustrates the three video PESs being supplied over an error free medium, to a program stream decoding function 90, The base layer PES may be supplied to a base layer AVC P-STD, including a buffer and a decoder, whereas the base Saver PES and the two enhancement layer PESs ENH1 and ENH2 are supplied to a program stream multiplexer, which includes a buffer that conforms to the SVC P-STD model. The program stream multiplexer supplies the base layer PES and the enhancement layer PES ENH1 to an SVC decoder 91, which includes a program stream demultiplexer that removes the PES headers from the base layer PES and the enhancement layer PES and directs the base layer bitstream to an elementary stream buffer segment ESb0 and the enhancement layer ENH1 bitstream to an elementary stream buffer segment ESb1. The outputs of the buffer segments ESb0 and ESb1 pass to a reassembly function. The sizes of the buffer segments ESb0 and ESb1 are variable in similar fashion to the sizes of the elementary stream buffer segments in the buffers 80 and 81. The operation of the SVC decoder 91 therefore corresponds, in the program stream context, to the operation of the buffers 80 and 81 and the reassembly function in the transport stream context.

The program stream multiplexer supplies the base layer PES and the two enhancement layer PESs ENH1 and ENH2 to an SVC decoder 92, which is similar to the decoder 91 but is augmented by an elementary stream buffer segment ESb2 corresponding to the elementary stream buffer in the T-STD buffer 82. The program stream decoding function 90 is therefore able to decode either the base layer alone, or the base layer and enhancement layer ENH1, or the base layer and both enhancement layer ENH1 and enhancement layer ENH2.

In both the embodiment shown in FIG. 4 and the embodiment shown in FIG. 5, available buffer size, based on the limitations in the H.264/AVC standard, including Annex G, may be allocated dynamically, on an as-needed basis, to the different layers of the bitstream produced by the encoder. By allowing dynamic flexible allocation of buffer size to the different Savers in this manner, the decoder may reduce the allocation of buffer size to the base layer and increase the allocation of buffer size to one or more of the enhancement layers based on, for example, complexity of the access units, to facilitate proper decoding.

The SVC delim NAL unit is easily detected by the transport stream demultiplexer 76 and facilitates separation of the SVC VCL NAL units. The SVC delim NAL unit is not recognized by the decoder and therefore has no effect on the decoding of the enhancement layer access units.

As described in connection with FIG. 4, the NAL separator may separate both the SVC non-VCL NAL units and the SVC VCL NAL units from the SVC access unit, so that the base layer PES includes only the AVC NAL units of the access unit structure shown in FIG. 2, and the enhancement layer PES contains all the SVC NAL units whereas in the case of FIG. 5 the NAL separator groups the SVC non-VCL NAL units with the AVC NAL units, so that the base layer PES contains the SVC non-VCL NAL units. This approach results in a slight increase in the bandwidth required to transmit the base layer PES, but it will be appreciated from an examination of the SVC access unit structure shown in FIG. 2 that by including the SVC non-VCL NAL units in the base layer FES, reassembly of the SVC access unit can be accomplished by simple concatenation of the NAL units included in the base layer PES and the enhancement layer PES respectively. Otherwise, parsing of the data would be required in the reassembly buffer, which would add latency and complexity to the process. The simplicity of reassembly of the SVC access unit offsets the slight disadvantage of requiring slightly greater bandwidth to transmit the base layer PES.

Referring to FIG. 6, the NAL separator and packetizers shown in FIG. 4 or 5, or the transport stream, demultiplexer 56 and video T-STD 60 shown, in FIG. 4 or the program stream or transport stream decoding function shown, in FIG. 5, may be implemented using a computer comprising at least one processor 161, random access memory 162, read only memory 163, I/O devices 164 (including suitable adaptors for receiving and transmitting bitstreams), a user interface .165, a CD ROM drive 166 and a hard disk drive 167, configured in a generally conventional architecture. The computer operates in accordance with a program that is stored in a computer readable medium, such as the hard disk drive 167 or a CD ROM 168, and is loaded into tire random access memory 162 for execution. The program is composed of instructions such that when the computer receives a bitstream conveying the particular input signal involved, by way of an Input adaptor, the computer allocates memory to appropriate buffers and utilizes other suitable resources and functions to perform the various operations that are described above with reference to FIGS. 4 and 5 and transmits, by way of an output adaptor, a bitstream conveying the particular output signal.

Although scalable video streams have been discussed above in connection with either one or two enhancement layers, it will be appreciated by those skilled in the art that Annex G to H.264/AVC allows up to seven enhancement layers. It will also be appreciated that although the foregoing description of enhancement layers has been in the context of scalable video, the other types of enhancement, to the AVC base layer are possible.

It will be appreciated that the invention is not restricted to the particular embodiment that has been described, and that variations may be made therein without departing from die scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least, the stated number of instances of the element hut is not intended to exclude from the scope of the claim a structure or method having more instances of that element than stated. The word, "comprise" or a derivative thereof, when used in a claim, is used in a nonexclusive sense that is not intended to exclude the presence of other elements or steps in a claimed structure or method. The appended claims employ terms (such as syntax structure) that are also used in reference documents pertaining to H.264/AVC, but this is by way of convenience for the skilled reader and is not intended to limit the scope of the claims to methods, apparatus and computer readable media that are dependent on the particular video coding described in H.264/AVC.

The invention claimed is:

1. A method of decoding an enhanced video stream, the method comprising:
 receiving a multiplexed transport stream conveying, in a plurality of packetized elementary streams, base layer video access units and enhancement layer video access units, each access unit comprising a plurality of syntax structures,
  wherein said multiplexed transport stream conveys, with different respective program identifiers, the syntax structures of the base layer access units and remaining syntax structures other than those of the base layer access units, and wherein the remaining syntax structures comprise a delimiting syntax structure marking a boundary of video layer syntax structures of the access unit;

demultiplexing the transport stream to create at least two program streams based on the different respective program identifiers;

passing the syntax structures of the base layer access units to a base layer buffer;

passing syntax structures of the enhancement layer access units to an enhancement layer buffer;

outputting the syntax structures passed to the base layer buffer in a predetermined sequence;

outputting the syntax structures passed to the enhancement layer buffer in a predetermined sequence; and recombining the sequences of syntax structures output by the base layer buffer and the enhancement layer buffer respectively to form a complete enhanced access unit, comprising base layer syntax structures and enhancement layer syntax structures in a predetermined sequence.

2. A method according to claim 1, wherein the enhanced video stream conveys a succession of enhanced access units each comprising a base layer access unit and at least one enhancement layer access unit, and the method further comprises separating the syntax structures of the base layer access units from the succession of enhanced access units.

3. A method according to claim 2, wherein the syntax structures of the enhancement layer access units comprise video layer syntax structures and non-video layer syntax structures, and the step of separating the syntax structures of the base layer access units from the succession of enhanced access units includes separating non-video layer syntax structures of the enhancement layer access units from the succession, whereby the syntax structures passed to the base layer butler include enhancement layer non-video syntax structures, and wherein all the video layer syntax structures of the enhancement layer access units pass to the enhancement layer buffer.

4. A method according to claim 2, wherein the syntax structures of an enhancement layer access unit in the succession of enhanced access units comprise video layer syntax structures, non-video layer syntax structures, and the delimiting syntax structure marking a boundary of the video layer syntax structures of the access unit, and the step of separating the syntax structures of the base layer access units from the unitary succession of access units includes passing syntax structures prior to the delimiting syntax structure to the base layer buffer and passing syntax structures after the delimiting syntax structure to the enhancement layer buffer.

5. A method according to claim 1, wherein:

the step of passing the syntax structures of the base layer access units to the base layer buffer comprises passing a first program stream of the at least two program streams, the first program stream conveying the syntax structures of the base layer access units, to the base layer buffer; and the step of passing the syntax structures of the enhancement layer access units to the enhancement layer buffer comprises passing remaining program streams of the at least two program streams to the enhancement layer buffer.

6. A method according to claim 1, wherein the base layer buffer includes an elementary stream buffer segment and the enhancement layer buffer includes an elementary stream buffer segment, and the method comprises dynamically adjusting the combined sizes of the elementary stream buffer segments to optimize decoding of the enhanced video stream while restricting the maximum size of the elementary stream buffer segment of the base layer buffer.

7. A method according to claim 1, comprising passing the complete enhanced access unit to a video decoder.

8. A method according to claim 1, wherein the enhancement layer access units contain syntax structures of at least first and second enhancement layers, and the step of passing remaining syntax structures to an enhancement layer buffer includes passing syntax structures of the first and second enhancement layers to first and second enhancement layer buffers respectively.

9. A method according to claim 8, wherein the enhanced video stream conveys a succession of enhanced access units each comprising a base layer access unit and at least first and second enhancement layer access units, and the method comprises separating the syntax structures of the base layer access units from the succession of enhanced access units.

10. A method according to claim 9, wherein the syntax structures of each enhancement layer access unit comprise video layer syntax structures and non-video layer syntax structures, and the step of separating the syntax structures of the base layer access units from the succession of enhanced access units includes separating non-video layer syntax structures of the first and second enhancement layer access units from the succession, whereby the syntax structures passed to the base layer buffer include enhancement layer non-video syntax structures, and wherein all the video layer syntax structures of the first and second enhancement layer access units pass to the first and second enhancement layer buffers respectively.

11. A method according to claim 9, wherein the syntax structures of an enhancement layer access unit in the succession of enhanced access units comprise video layer syntax structures, non-video layer syntax structures, and a delimiting syntax structure marking a boundary of the video layer syntax structures of the access unit, and the step of separating the syntax structures of the base layer access units from the unitary succession of access units includes passing syntax structures prior to the delimiting syntax structure to the base layer buffer and passing syntax structures after the delimiting syntax structure to the enhancement layer buffer.

12. A method according to claim 8, comprising receiving a multiplexed transport stream conveying the syntax structures of the base layer access units with a first program identifier, syntax structures of the first enhancement layer with a second program, identifier, and syntax structures of the second enhancement layer with a third program identifier, demultiplexing transport stream to create at least first, second and third program streams based on the first, second and third program identifiers respectively, and passing the first, second and third program streams to the base layer buffer and the first and second enhancement layer buffer respectively.

13. A method according to claim 8, wherein the base layer buffer includes an elementary stream buffer segment and the first and second enhancement layer buffers includes a first and second elementary stream buffer segments respectively, and the method comprises dynamically adjusting the combined sizes of the elementary stream buffer segments to optimize decoding of the enhanced video stream while restricting the maximum size of the elementary stream buffer segment of the base layer buffer.

14. A method according to claim 8, comprising passing the complete enhanced access unit to a video decoder.

* * * * *